United States Patent
Miles et al.

(10) Patent No.: US 7,491,148 B2
(45) Date of Patent: Feb. 17, 2009

(54) SYSTEM FOR IMPROVING THE REFURBISHING OF A TRANSMISSION

(75) Inventors: David Michael Miles, Edmond, OK (US); Barry Eugene Wilson, Yukon, OK (US); Michael Joseph Standifer, Norman, OK (US)

(73) Assignee: Autocraft Industries, Inc., Oklahoma City, OK (US)

( * ) Notice: Subject to any disclaimer, the term of this patent is extended or adjusted under 35 U.S.C. 154(b) by 547 days.

(21) Appl. No.: 11/152,538

(22) Filed: Jun. 14, 2005

(65) Prior Publication Data

US 2005/0278949 A1    Dec. 22, 2005

Related U.S. Application Data

(60) Provisional application No. 60/581,266, filed on Jun. 18, 2004.

(51) Int. Cl.
    *F16H 3/44* (2006.01)
(52) U.S. Cl. ...................................................... 475/269
(58) Field of Classification Search .................. 475/269
    See application file for complete search history.

(56) References Cited

U.S. PATENT DOCUMENTS

| | | | | |
|---|---|---|---|---|
| 4,120,219 A | * | 10/1978 | Van der Horst | 82/147 |
| 4,296,848 A | * | 10/1981 | Kagata et al. | 192/35 |
| 4,585,423 A | * | 4/1986 | Kwan | 446/230 |
| 4,665,802 A | * | 5/1987 | Barker et al. | 92/23 |
| 5,058,455 A | * | 10/1991 | Nemoto et al. | 74/606 R |
| 5,947,251 A | * | 9/1999 | Goins | 192/89.26 |
| 6,149,543 A | * | 11/2000 | Breen | 475/269 |
| 6,412,341 B1 | * | 7/2002 | Ballew | 73/115.02 |
| 6,792,823 B2 | * | 9/2004 | Takahashi et al. | 74/431 |
| 6,986,462 B2 | * | 1/2006 | Venkatesh et al. | 235/383 |
| 7,247,125 B2 | * | 7/2007 | Scelers | 477/127 |
| 7,305,325 B2 | * | 12/2007 | Kostyk et al. | 702/183 |

* cited by examiner

*Primary Examiner*—Ha D. Ho
(74) *Attorney, Agent, or Firm*—David W. Carstens; Carstens & Cahoon, LLP

(57) ABSTRACT

A kit for improving the repair of a transmission. The kit presents components in a well organized fashion. The kit includes certain individual components and groups of components in preassembled subassemblies. For example, a subassembly can be preassembled to factory level tolerances. Thus, during the repair, the defective, subassembly can be removed and the preassembled replacement can be installed, saving a significant amount of repair time. It also makes the refurbished transmission less likely to fail. If the kit contains all of the transmission parts, then it is likely that all or only a portion of the parts will be used during the repair. Any unused parts can then be placed back into the kit, along with the used parts, and the kit can be returned for a partial refund or a credit.

10 Claims, 10 Drawing Sheets

SYSTEM FOR IMPROVING THE REFURBISHING OF A TRANSMISSION

RELATED APPLICATIONS

This application claims the benefit, under 35 U.S.C. § 119(e)(1), of U.S. Provisional application Ser. No. 60/581,266, filed Jun. 18, 2004, which is incorporated herein by this reference.

BACKGROUND OF THE INVENTION

1. Technical Field

The present invention relates generally to a kit that contains the necessary components, wear parts and subassemblies necessary to refurbish a transmission. Specifically, the kit includes the parts necessary to refurbish a specific transmission or a transmission from a family of transmissions having similar design.

2. Description of Related Art

Transmissions are an essential component of any vehicle. They transmit the force generated by the engine to the vehicle's wheels. Transmissions are comprised of hundreds, if not thousands, of components, including certain components that are purposely designed to wear down. With use and under extreme conditions, these wear components become less effective and ultimately fail. For example, a gasket can fail and allow transmission fluid to leak out of the casing that houses the transmission. Once a transmission failure occurs, the vehicle's owner will typically take the vehicle in for repair. If the problem is minor, the transmission will be repaired. If the problem is significant, then the transmission will be replaced. For the vehicle's manufacturer, the warranty cost associated with replacing a transmission is very high. Therefore, the manufacturer has a need to increase the ease with which a complicated transmission can be refurbished, even when it has suffered a significant failure.

All modern transmissions are extremely complicated mechanical devices. Therefore, it is not uncommon for a transmission repair to take over ten hours to complete, even if a skilled technician is performing the repair. Thus, the cost of labor for the repair is very high. Moreover, due to the large number of variations to transmissions, it is uncommon for a skilled technician to be familiar with even a small subset of existing transmissions. Therefore, the likelihood that the transmission will be fixed properly is relatively low. Indeed, it is common for 25% to 30% of all repair jobs to be flawed. Therefore a need exists for a system that will decrease the labor cost of a transmission repair while at the same time increasing the quality of the repair.

Over the life of a transmission design, it might be installed in several million vehicles. During that cycle, improvements might be implemented to address ongoing failure modes. For example, if a particular component has a tendency to crack, later versions of the same transmission might be equipped with the same component implemented in a different material. This improves the reliability and the safety of the transmission. Therefore, a need exists to enable the technician to replace the faulty components of a transmission even if he has no knowledge of the fault.

It is also difficult for an average vehicle repair shop to maintain an adequate inventory of parts for the large number of transmission designs in service. If the repair facility does not have the specific component(s) in inventory, the time and cost of the repair simply increases. Therefore, a need exists for a more efficient method of making specific components available to a repair shop.

Finally, all transmissions include a variety of subassemblies. These subassemblies are assembled to very specific tolerances. But when the subassembly has to be disassembled for a repair, it is rare that the same tolerances can be achieved upon reassembly. Thus, a need exists for a method of refurbishing a transmission that results in the same factory level tolerances to be achieved.

SUMMARY OF THE INVENTION

The present invention is a novel system of refurbishing a transmission by providing a kit containing all the necessary elements of the transmission being repaired. The kit contains the components in a fashion that is well organized. Further, while some individual components are stored in the kit, others are preassembled into subassemblies. For example, a direct clutch or an intermediate clutch both might be preassembled to factory level tolerances. Thus, during the repair, the defective clutch can be removed and the preassembled replacement clutch can be installed. This saves a great amount of time for the repair. It also makes the refurbished transmission less likely to fail.

If the kit contains all of the transmission parts, then it is likely that all or a portion of the parts will be used during the repair. In the event that all parts are not used, the repair man will place the unused parts back into the kit, along with the used parts and the kit will be returned for a partial refund or a credit. Kits can be centrally located for quick delivery to the local repair shops. This alleviates the need for the repair shop to maintain a large inventory of parts.

The kit can also be laid out and labeled in a logical fashion. This will minimize the risk of confusion over the identity of specific parts. Further, in one aspect, a kit may include a number of alternative parts. For example, the E40D transmission by Ford is actually a family of transmissions. There may be ten or more varieties of E40D transmission, each with a subtle difference in specific components. Thus, the reverse planetary gear for a 1998 Ford F-150 might differ from a reverse planetary gear for a 2001 Ford F-150. Rather than have separate kits for each, in one aspect, the present invention may place both varieties into the same kit. In one aspect, the kit includes only upgraded or current design components for a specific transmission.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

The present invention addresses the problems encountered during transmission repairs, namely the time, expense, and reliability. The time of repair is reduced, the expense of the repair is reduced and the reliability of the repaired transmission is increased by supplying a kit of preassembled transmission subassemblies and wear parts. To understand the advantage of the present invention, it is important to appreciate the complexity of modern transmissions.

The transmission is probably a vehicle's most complex system in terms of automotive mechanics. Transmission systems vary from one vehicle to another. With a manual transmission (sometimes called a standard transmission), an operator shifts into the proper gear at the proper time. In an automatic transmission, on the other hand, the shifting is performed by the transmission. But the result is the same. In either case, the transmission transmits power from the engine and directs it to the wheels. It is part of a system that has several components, commonly known as the drive train.

Tires must be told how fast to turn, and they must be supplied with extra power for starting, climbing hills, and pulling heavy loads. All these things are accomplished via the drive train. When one steps on the accelerator, the engine is compelled to produce power, but that power has to get to the wheels in the proper way for the wheels to respond most efficiently. There are ways to convey that extra power to the wheels by controlling how fast they turn in relation to the engine's speed. Thus, a transmission has more than just forward and reverse gears; it has low and high gears as well. Some transmissions have as many as six forward gears to control power and speed efficiently. In all cases, the lower gears provide more power at lower speeds. The higher gears provide less power but allow the vehicle to move at higher speeds because the wheels can turn faster in these gears at any engine speed.

Figure 1:
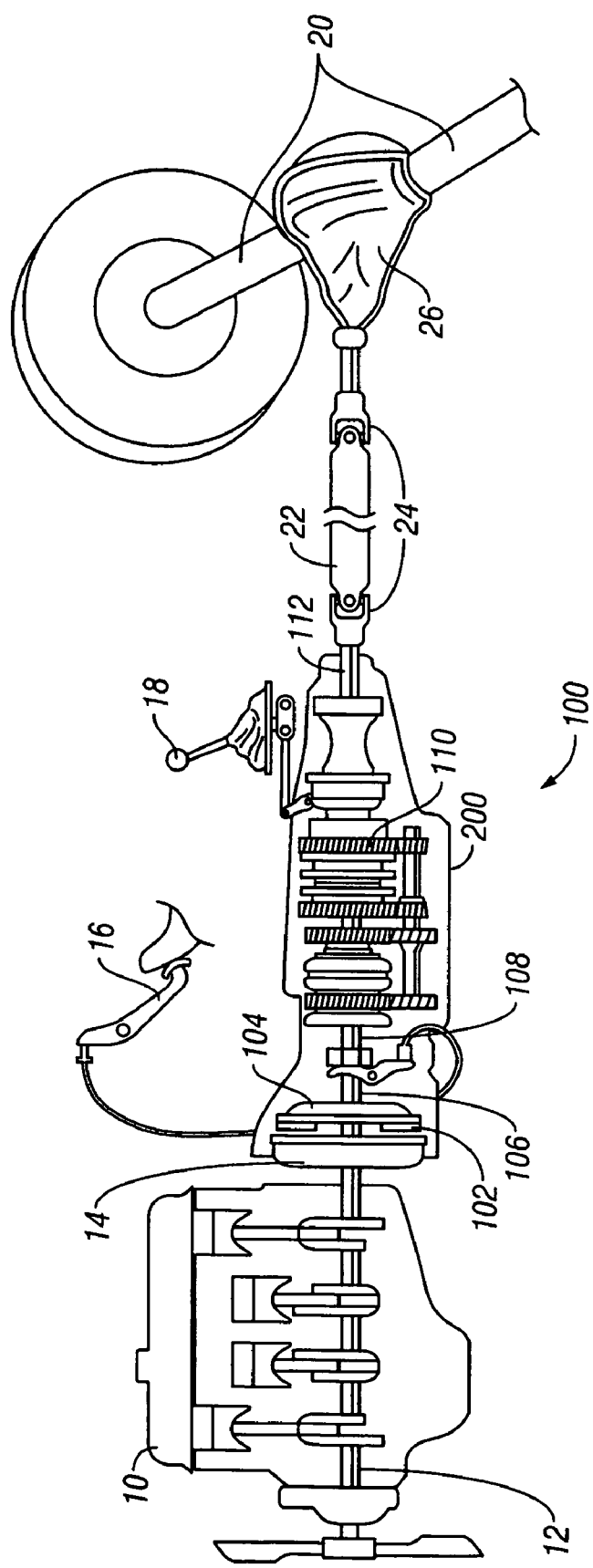
FIG. 1 is a pictorial representation of a manual transmission showing its relationship between the engine and the differential.

FIG. 1 is a pictorial representation of a manual transmission showing its relationship between the engine and the differential. The running engine 10 produces power that causes the crankshaft 12 to turn at a particular rate of speed. The faster the engine 10 runs, the more power it produces and the faster the crankshaft 12 turns. At the rear end of the crankshaft 12 is the engine flywheel 14. This disk-shaped plate turns at the same rate, and in the same direction, as the crankshaft 12. Facing the flywheel 14 is the first part of the clutch. This disk-shaped plate is called a clutch disk 102. When one is not stepping on the clutch pedal 16, this disk 102 is forced against the flywheel 14. A coating of friction material causes the two plates to adhere to each other, which forces them to turn at the same speed. Next to the clutch disk 102 is the clutch pressure plate 104. This mechanism forces the clutch disk 102 against the flywheel 14 or allows the clutch disk 102 to move away from the flywheel 14 when it is time to change gears.

When one steps on the clutch pedal 16 to disengage the clutch and disconnect the engine 10 from the transmission 200, a clutch release arm forces a throwout bearing 108 into the pressure plate's release levers. As a result, the pressure on the clutch disk 102 is released, and the disk can turn independently of the flywheel 14. After the proper gear has been shifted into, the clutch pedal is released. This movement causes springs in the pressure plate to force the disk against the flywheel 14 again, and both the disk 102 and the flywheel 14 resume spinning together at a new speed. In this way, the clutch disk 102 can catch up with an engine 10 that is turning faster—or more slowly—than before and can transmit its motion to the transmission 200. On the clutch side of the flywheel 14, the drive train continues, it is now called the transmission input shaft 106 because it carries the power via the turning shaft into the transmission 200. The input shaft 106 rotates at the same speed and in the same direction as the crankshaft 12.

Inside the transmission is a group of gears 110 of varying sizes. These gears can move together and apart, in various combinations, to determine how fast and with how much power the car's wheels will turn, and in which direction. The next part of the drive train is called the transmission output shaft 112 because it transmits the power that the transmission is putting out to the driveshaft. The driveshaft of a rear-wheel-drive vehicle with a conventional engine has a U-joint 24 (short for universal joint) at either end. The U-joints 24 enable the driveshaft to move freely without affecting the more rigid transmission shaft at one end, and to absorb the vertical movement of the rear axle and wheels at its other end. On cars with transverse engines, you can find the U-joints where each axle joins the transaxle and where each connects with the car's drive wheels. Called constant velocity (CV) joints, they can, like other U-joints, turn and move in any direction—up, down, and from side to side. The differential 26 is another box of gears that takes the movement of the spinning driveshaft through a 90-degree angle to the axle that turns the drive wheels. The differential 26 also allows each side of the axle to rotate at a different speed. This ability is necessary because, when the vehicle goes around a sharp curve, the outside wheel travels farther than the inside wheel and has to move more quickly than the inside wheel. The differential 26 also provides the drive wheels with extra power by using its gears to convert every three revolution of the driveshaft into one revolution of the drive wheels, which is called a 3:1 gear ratio. On front-wheel-drive cars, the differential is located inside the transmission; that's why it's called a transaxle assembly.

The transmission 200 contains the gears 110 and responds to messages from the gearshift and the clutch. The gears are actually metal wheels with notches on the rims that allow them to mesh with one another. Originally, the gears in most manual transmissions were moved into and out of mesh with each other by the gearshift lever. In modern vehicles, the gears are always in mesh and only the synchronizers move, causing a change in power flow.

Figure 2A:
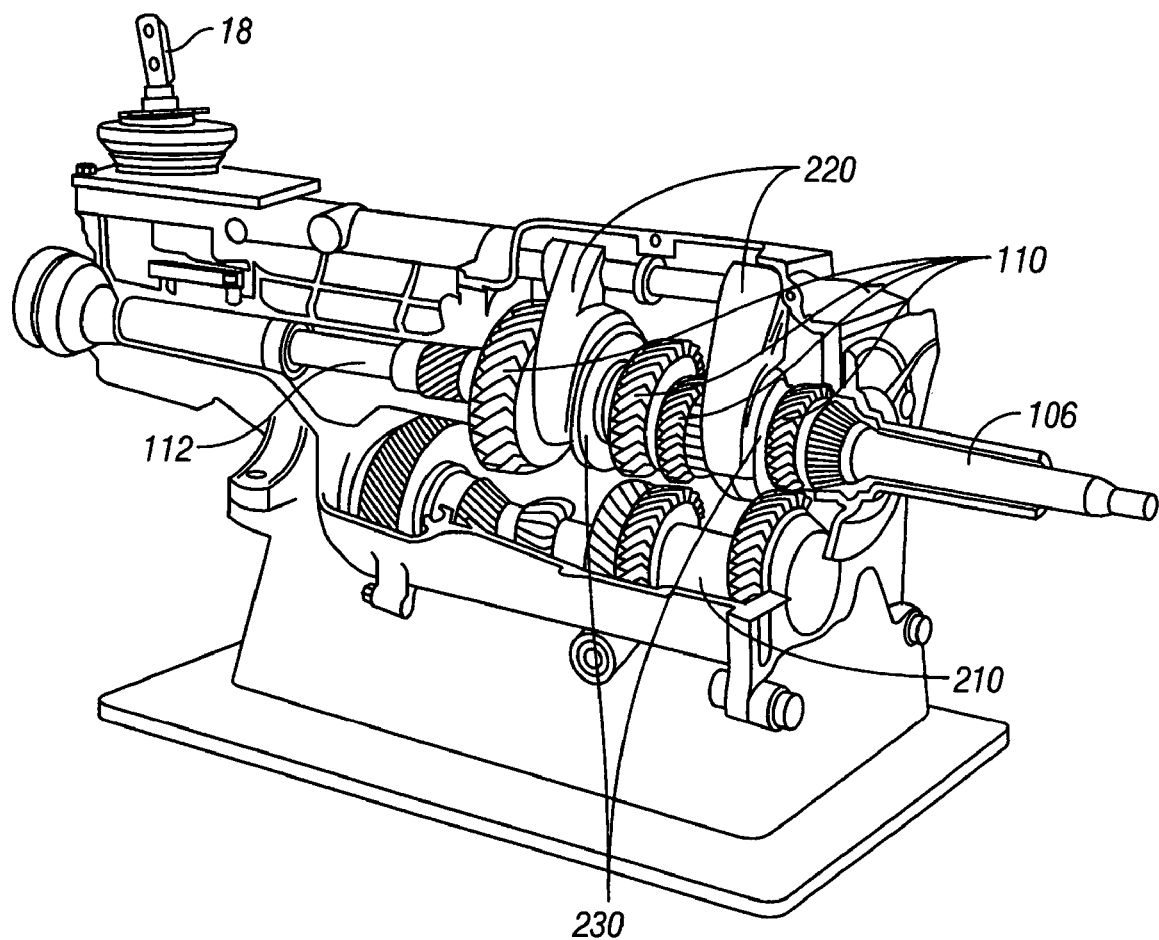
FIG. 2A provides a simplified illustration of the gearing used in a manual transmission.

FIG. 2A provides a simplified, cutaway perspective illustration of the gearing used in a manual transmission. There are two shift forks 220 that are engaged by the shift lever 18. The shift lever 18 has a rotation point in the middle. When the shift lever 18 is pushed forward to engage first gear, one of the shift forks 220 is pushed in the opposite direction, thereby moving the respective collar 230 to engage first gear. When the shift lever 18 is pulled back, the same collar can move 230 to engage second gear. When the shift lever 18 is moved from left to right, for example to engage third gear, the other shift fork 220, and the other collar 230 is engaged.

The number of gear wheels in the transmission depends on the number of forward speeds the vehicle has. An additional gear reverses the direction of power so the vehicle can move backward. This reverse gear works in conjunction with the lower gear. Generally speaking, the faster the engine runs, the more power it puts out. If extra power is needed, for example, to get a car up a hill, the engine 10 must run faster than it runs simply to maintain speed of the vehicle on a flat surface road. Low gears supply that power by making your wheels turn at a slower rate than the engine does.

Figure 2B:
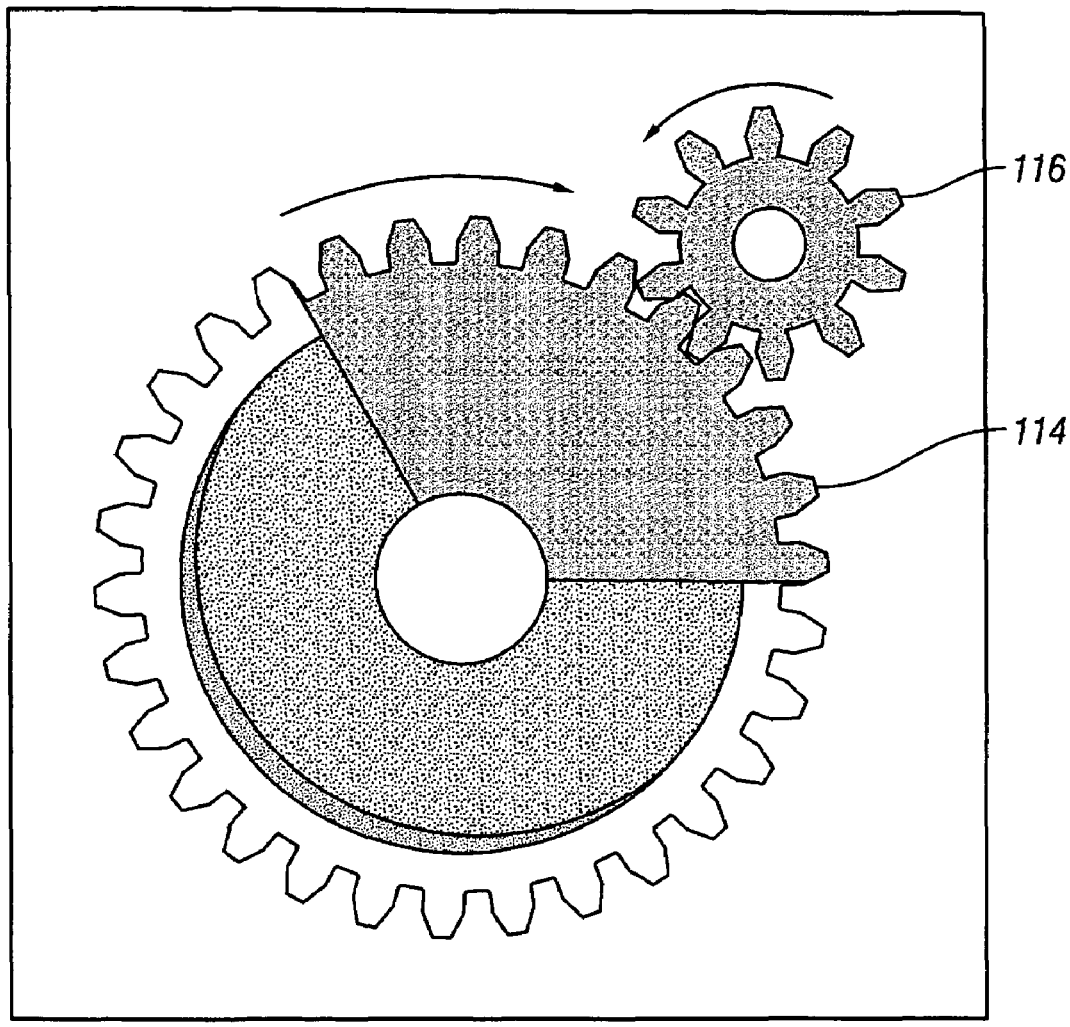
FIG. 2B depicts a simplified end view of a large gear placed to a small gear so that their teeth mesh.

FIG. 2B depicts a simplified end view of a large gear placed to a small gear so that their teeth mesh. If the large gear 114 has teeth and the small gear 116 has teeth, the large gear 114 turns once to every three turns of the small gear 116. In other words, the large gear 114 turns only a third of the way around for every complete revolution of the small gear 116. The gears in a transmission work on this principle, which is called a 3:1 gear ratio. As shown in FIGS. 1 and 2A, the turning drive train brings a gear into contact with other gears of different sizes. That's why the transmission input shaft 106 that runs between the engine and the transmission turns at the same rate of speed as the engine 10, but the transmission output shaft 112 that leaves the transmission and carries the power via the driveshaft and differential to the rear wheels turns at a different rate, depending on which gears in the transmission are engaged.

In low gear, the gears in the transmission make the driveshaft (and therefore the wheels) turn more slowly than the engine. In fact, the driveshaft may turn only once for every four engine revolutions. All the power of the swiftly running engine is channeled into those few turns. The wheels turn more slowly, but they have more power to put into each turn, so your car can start, climb a hill, or pull a trailer. Not only does the engine run faster, but the gears provide the mechanical advantage of the big gear providing more leverage by turning slowly but with more force.

In second gear, the engine turns more slowly than it did in low, putting out less power but more speed because the wheels can turn more quickly. In this gear, the driveshaft may turn once for every two engine revolutions, or twice as fast as in low gear.

In high gear, the gear ratio can drop to around 1:1, which means that the engine and the driveshaft turn at relatively the same rate of speed. Although the speed of the wheels is relatively fast, additional power is not required from the engine to produce that speed. Further, once the speed of the car is achieved from lower gears, once in high gear, the power required to maintain speed is that to overcome wind resistance and the surface of the highway.

Figure 3:
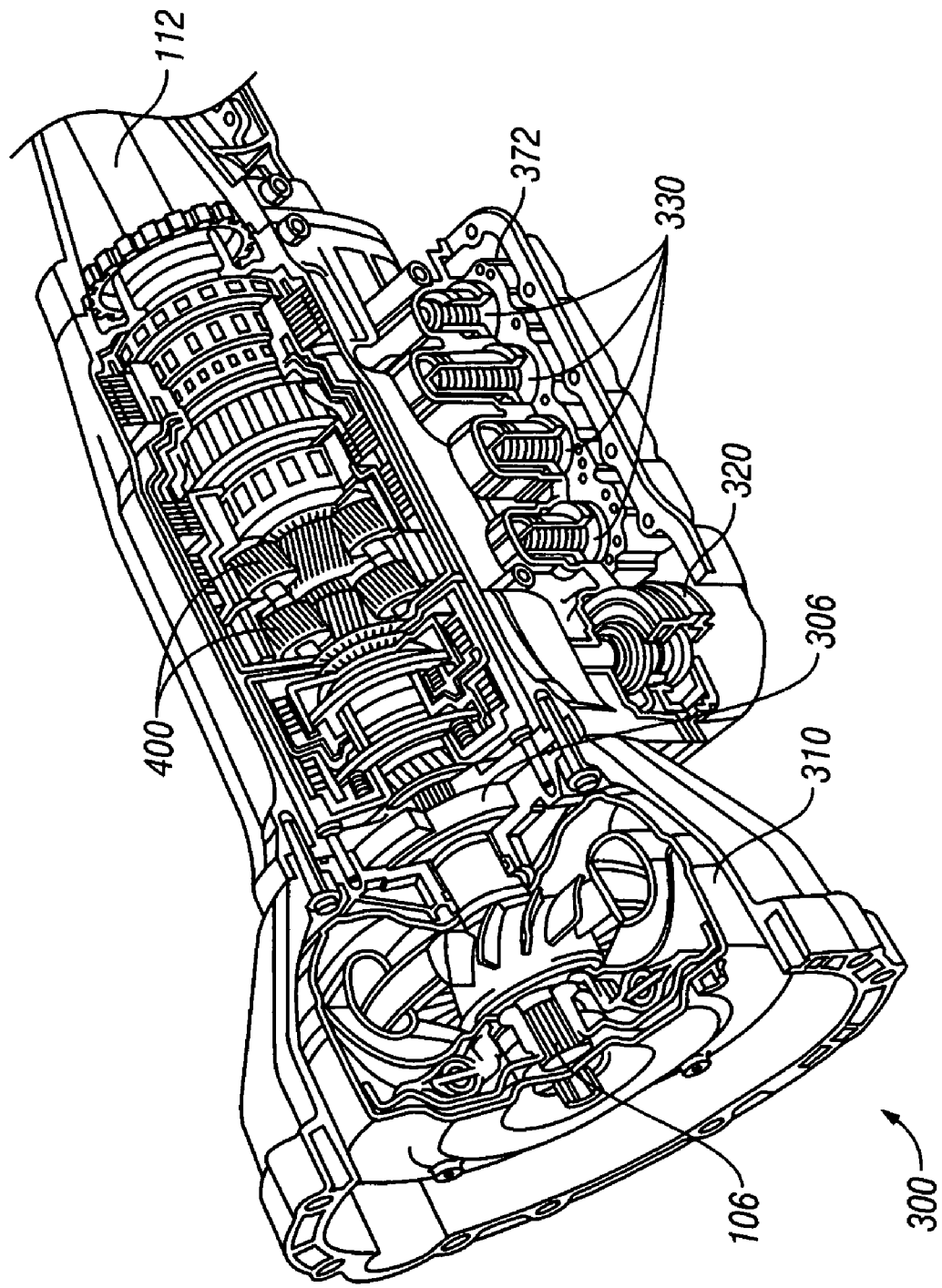
FIG. 3 represents a simplified, perspective, cutaway view of an automatic transmission.

FIG. 3 depicts a simplified, cutaway perspective view of an automatic transmission. FIG. 3 provides a glimpse at the actual complexity of a modern automatic transmission 300 and the general location of the input shaft 106 and output shaft 112. An automatic transmission 300 works on the same basis as a manual transmission does, with a gear selector on the steering column or floor to allow one to put the car in park, idle, reverse, to go forward at varying speeds, or move into lower gears in certain circumstances. Instead of a manual clutch, an automatic transmission uses a torque converter 310 and hydraulic pressure to change gears automatically.

The torque converter 310 replaces the standard transmission's clutch. The torque converter 310 is a fluid coupling that transfers power from the engine to the transmission input shaft 106. The torque converter 310 allows for smooth transfer of power and at highway speeds can be locked up to reduce slippage and improve fuel economy. Shifting in an automatic transmission 300 is controlled by either a hydraulic system or an electronic system. Hydraulic controlled transmissions consist of an intricate network of valves and other components along with hydraulic pressure to control the operation of planetary gearsets 400. These gearsets 400 can be fashioned to generate three, four, or five forward speeds.

A very thin oil called transmission fluid fills the transmission system and generates hydraulic pressure. As the engine speed changes, the pump 306 that pumps the transmission fluid to develop hydraulic pressure also changes speed. The transmission fluid responds to the changes in pressure by flowing through the transmission at different rates. When the car is moving slowly, the pressure is low, and only the low gears respond. With the gear selector in "Drive," as the car's speed increases, so does the pressure, and higher gears are brought into play. The hydraulic pressure drives the transmission gears by means of friction bands and plates. These bands and plates do the same thing that the clutch on a manual transmission does—they pull various gears into and out of action. This above explanation is a simplified version of what actually happens and is provided for background purposes only.

Figure 4A:
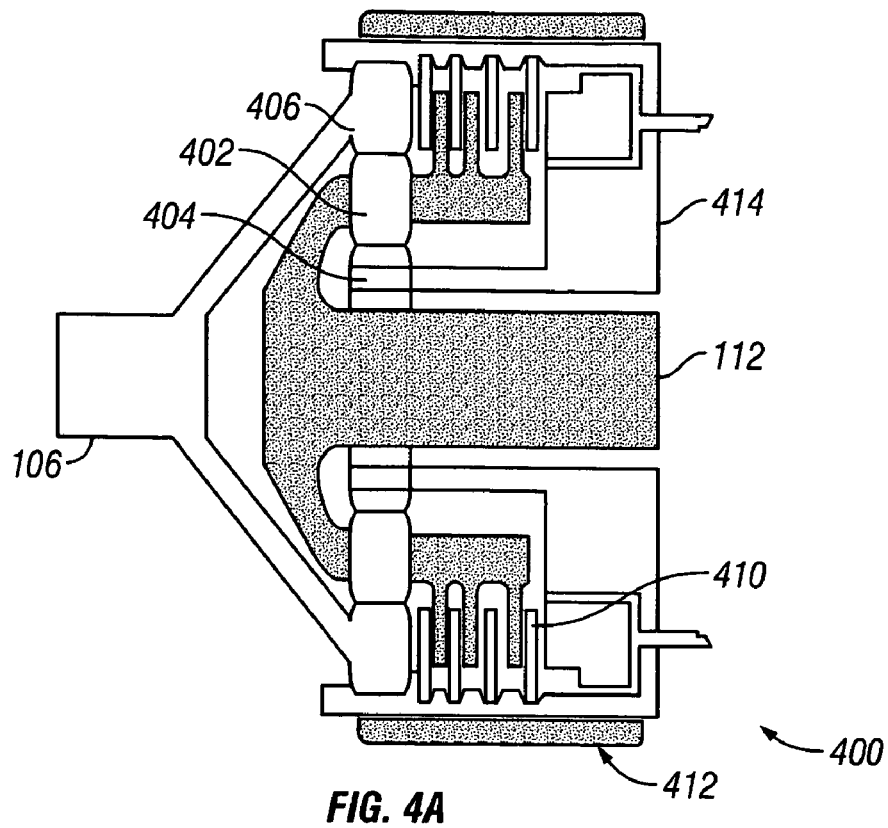
FIG. 4A depicts a cross-sectional view of a planetary gearset.
Figure 4B:
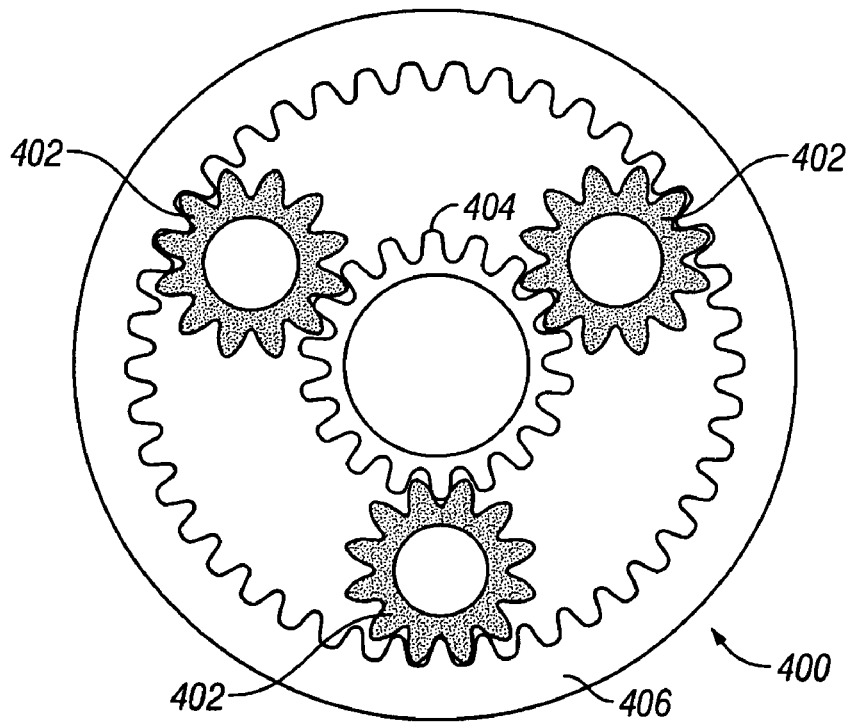
FIG. 4B depicts an end view of a planetary gearset.

FIG. 4a depicts a cross sectional side view of a planetary gear set 400. FIG. 4b is a cross-sectional front view of a planetary gear set. Referring to FIGS. 4a and 4b, an input shaft 106 is connected to the ring gear 406. The output shaft 112 is connected to the planetary carrier which is also connected to a multi-disk clutch pack 410. The sun gear 404 is connected to a drum 414 which is also connected to the other half of the clutch pack 410. Surrounding the outside of the drum 414 is a band 412 that can be tightened around the drum 414 when required to prevent the drum 414 with the attached sun gear 404 from turning. The clutch pack 410 is used, in this instance, to lock the planetary carrier with the sun gear 404 forcing both to turn at the same speed. If both the clutch pack 410 and the band 412 were released, the system would be in neutral. Turning the input shaft 106 would turn the planetary gears 402 against the sun gear 404, but since nothing is holding the sun gear 404, it will just spin free and have no effect on the output shaft 112. To place the unit in first gear, the band 412 is applied to hold the sun gear 404 from moving. To shift from first to high gear, the band 404 is released and the clutch is applied causing the output shaft 112 to turn at the same speed as the input shaft 106.

Newer transmissions use electronically controlled solenoids to control shifting because electronic shifting is more precise than hydraulic systems. A four-wheel-drive vehicle also includes a transfer case. The transfer case mounts between the transmission and the driveshafts to control the power to the front and rear drive axles. When one switches from two- to four-wheel drive with either a dash-mounted switch or a floor-mounted shifter, a gear in the transfer case engages the front driveshaft along with the rear driveshaft so that all four wheels get power from the engine. In two-wheel drive, only the driveshaft connected to the rear wheels gets power from the engine, and the front wheels are disengaged. In four-wheel drive, the engine powers all the wheels. In contrast, an all-wheel-drive (AWD) vehicle sends power to all four wheels all the time. AWD vehicles usually employ a center differential to split power from the engine to the front and rear wheels.

Referring back to FIG. 3, the transmission 300 contains several hundred individual components. These components are generally grouped into a finite number of subassemblies: including an oil pump assembly 306, torque converter 310, servo piston assembly 320, accumulator piston assemblies 330, main control 372, and planetary gears 400. Each of these subassemblies is a compilation of numerous parts. For example the intermediate clutch is comprised of almost 26 separate elements or other subassemblies. In one embodiment, the kit of the present invention comprises a pre-built intermediate clutch to replace the defective clutch in the vehicle. The damaged clutch can thereby be removed and the rebuilt clutch can be installed. The rebuilt clutch, supplied in the kit is already built to required tolerances and in one embodiment is additionally pre-tested to ensure its quality.

The kit can be placed in a package that contains separation media. This separation media can define several storage locations. In one embodiment, the storage locations can include a label having markings to assist the user in identifying the components and subassemblies. During the repair and refurbishing of the transmission, the user can remove worn and damaged components and subassemblies from the transmission. In one embodiment, these can be repacked into the same kit and returned. The kit can have an initial cost and be stored at a central facility. Dealerships and independent repair shops can call this storage site and the appropriate kit will be sent out. The kit can also include repair instructions on paper, video or otherwise to assist the repair man. In one embodiment, once the repair is completed, then the kit can be returned. In one embodiment, a credit can be issued for the unused parts. Likewise, by placing the used components and subassemblies into the kit, it makes it easier to generate another kit by refurbishing those parts. In other words, kits can include a mixture of reclaimed, remanufactured hard parts and new components. This is unique to the transmission world. This allows the kits to be sold at a competitive price reducing labor cost and delivering a quality product to the end user.

Kits corresponding to different repair levels can also be supplied with distinct sets of parts or assemblies for transmission and/or transaxle overhaul, depending upon the extent of the repair required. For example, in a first embodiment, if a low level of repair is required, a kit can comprise gaskets and seals, O-Rings, a transmission filter, and steel plates and frictions. In a second embodiment, the kit can, in addition to the parts in the first embodiment, additionally comprise bolts, fasteners, hardware, bearings, thrust washers, snap rings, U/D pistons and retainer, and an L/R retainer. In a third embodiment, the kit can, in addition to the parts in the second embodiment, further comprise a new or remanufactured oil pump assembly, a new or remanufactured valve body assembly, and a new or remanufactured input clutch assembly. In a fourth embodiment, the kit can, in addition to the parts in the first embodiment, include parts that are selected by a dealer or repair shop and can additionally include an oil pump assembly, a remanufactured valve body assembly, an input clutch assembly, a solenoid, and/or a planetary gear set.

Figure 5A:
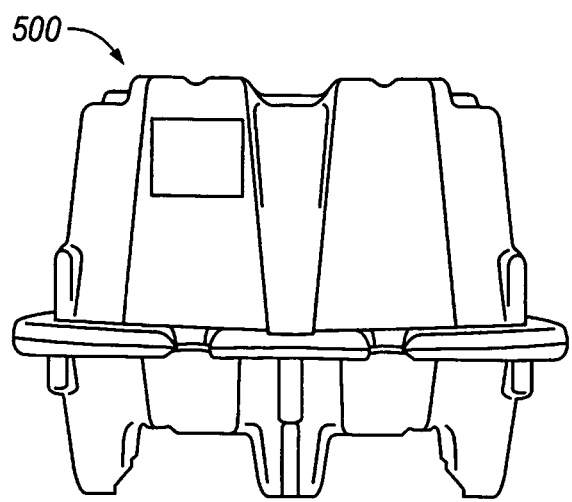
FIG. 5A-E illustrates a kit for containing the parts of a transmission in accordance with one embodiment of the present invention.
Figure 5B:
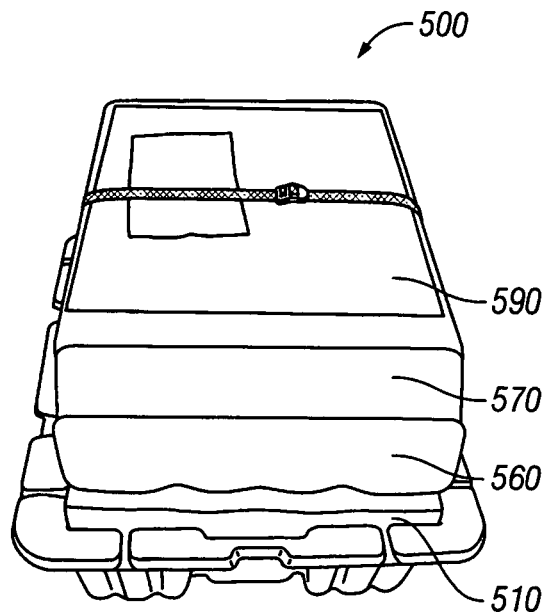

FIG. 5a-5e illustrates a kit that might contain the parts for a model E40D rear wheel drive transmission in accordance with one embodiment of the present invention. FIG. 5a depicts the kit 500 in an enclosure that can store the various parts. In one embodiment, the enclosure comprises a shipping container. FIG. 5b illustrates a packing configuration once the lid from the container has been removed. There are a plurality of separate packages 510 570 590 having various parts and assemblies. The bottom insert 510 and top insert 570 can be separated by a spacer 560. Placement of the various parts and assemblies in the separate packages can be based upon space available in the package and/or the relationship of the assemblies to one another.

Figure 5C:
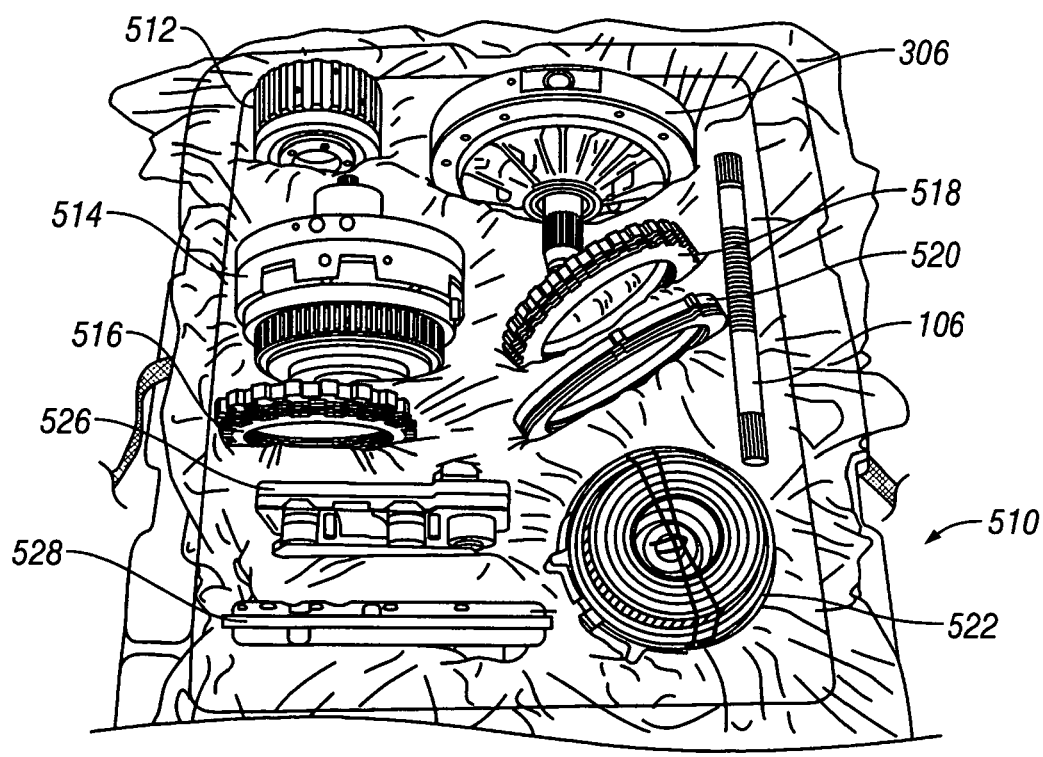

The bottom insert 510 depicted in FIG. 5c contains parts that have wear items and/or close tolerance parts that require cleaning and inspection to assure proper function. The package 510 comprises an input shaft 106, an oil pump assembly 306, a reverse planetary and reverse clutch hub assembly 512, a coast clutch, overdrive planetary, overdrive clutch, intermediate clutch piston and center support assembly 514, a plurality of reverse clutch fiber and steel plates 518, a plurality of overdrive clutch and steel plates 520, a direct clutch, forward clutch, forward planetary clutch, and sungear shell assembly 522, a solenoid control body 526, and a transmission oil filter 528.

Figure 5D:
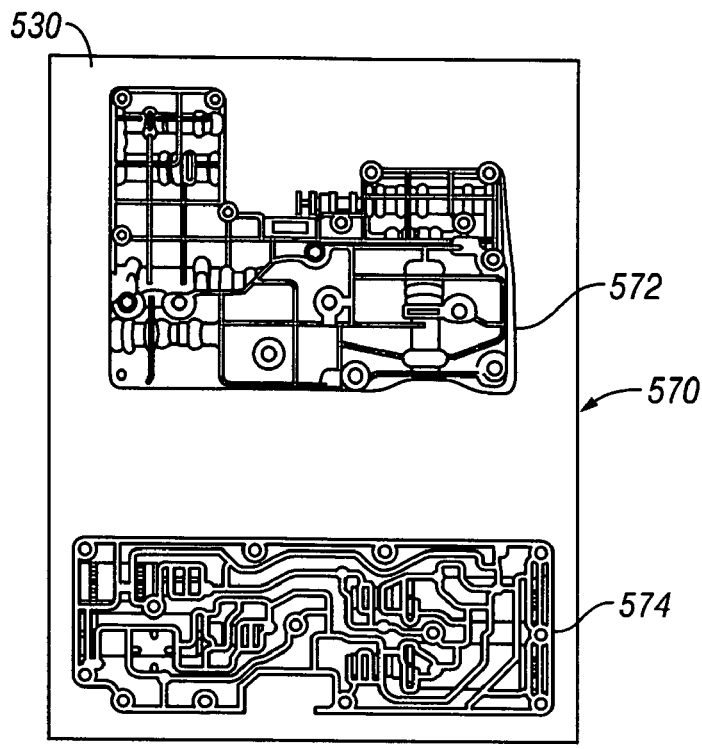
Figure 5E:
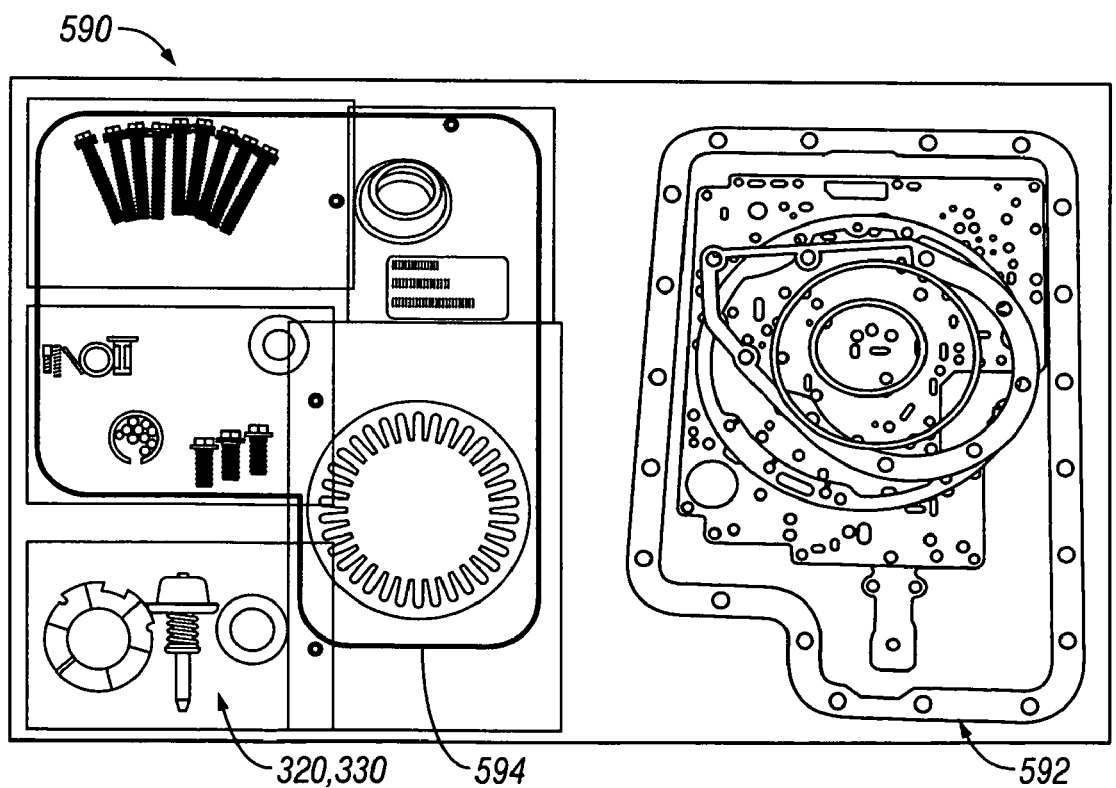

As depicted by FIG. 5d, the top insert 570 comprises a main control 572 and an accumulator body 574. Similarly, FIG. 5e comprises a "pick and pack" package 590 comprising various gaskets 592 packaged together, individually packaged items 594 including gaskets, seals, thrust washers, and bolts, and one or more servo piston assemblies 320 or accumulator piston assemblies 330.

Figure 6A:
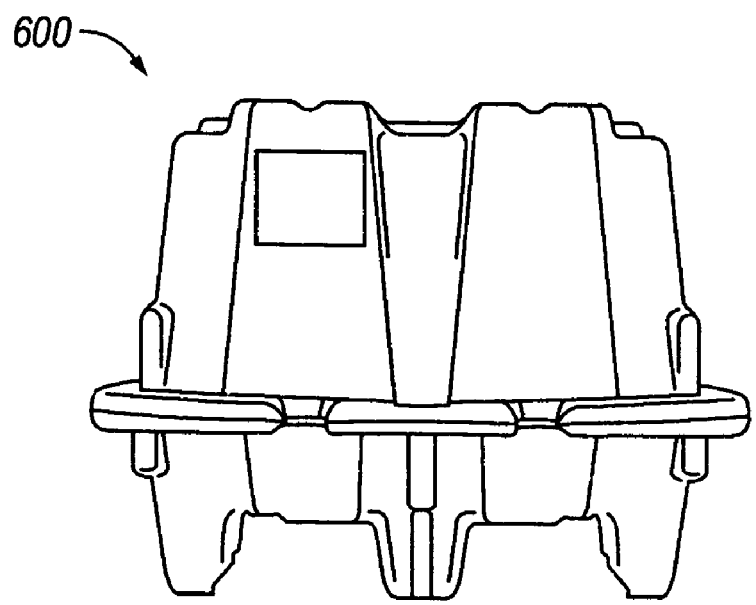
FIG. 6A-E illustrates a kit for containing the parts of a transmission in accordance with one embodiment of the present invention.
Figure 6B:
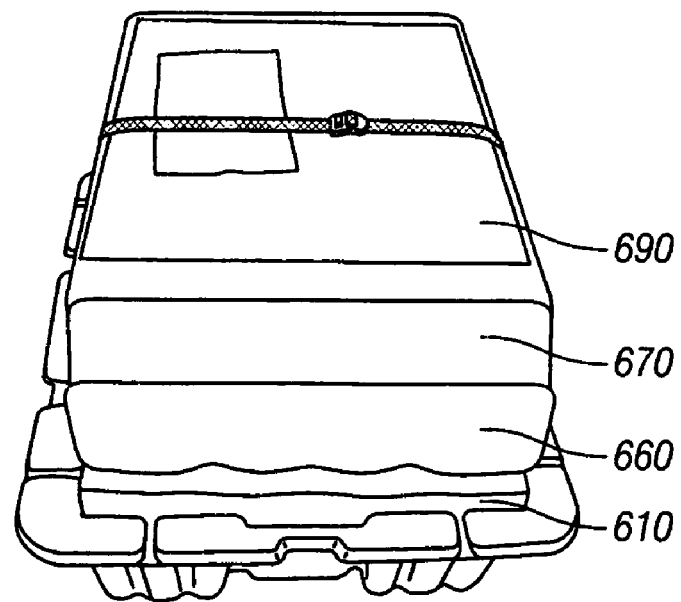

FIG. 6a-6e illustrates a kit that might contain the parts for a front wheel drive transmission in accordance with one embodiment of the present invention. FIG. 6a depicts the kit 600 in the shipping container that can store the various parts. FIG. 6b illustrates a packing configuration once the lid from the container has been removed. There are a plurality of separate packages 610 670 690 having various parts and assemblies.

Figure 6C:
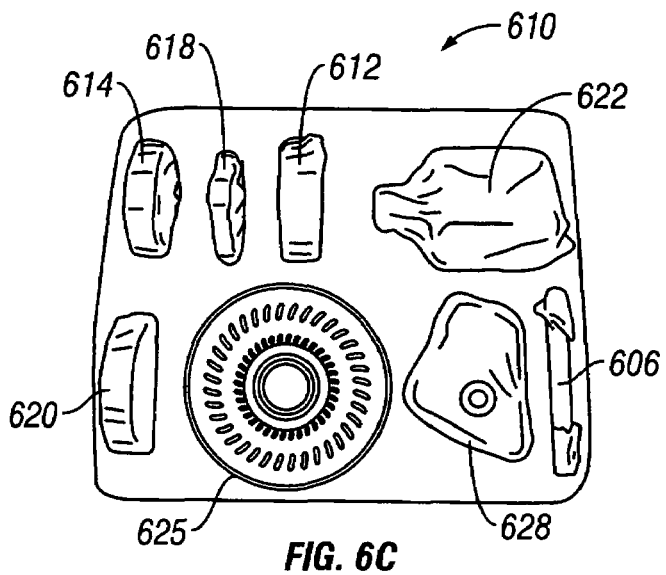

The bottom insert 610 depicted in FIG. 6c comprises a planetary gearset, direct clutch, intermediate clutch and sungear assemblies 622 all packaged together. This package also comprises the torque converter assembly 625, the low/intermediate clutch fiber and steel plates 618, the low/intermediate clutch support and piston 614 and the reverse clutch assembly 612. Also packaged is the brake band 620, the oil pump drive shaft 606, and the transmission oil filter 628.

Figure 6D:
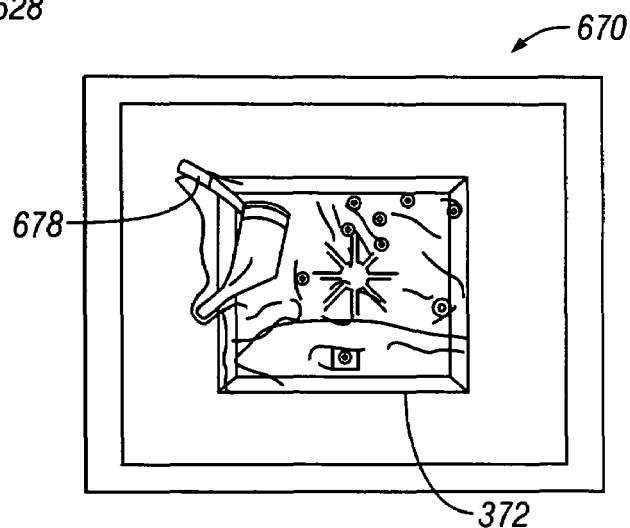
Figure 6E:
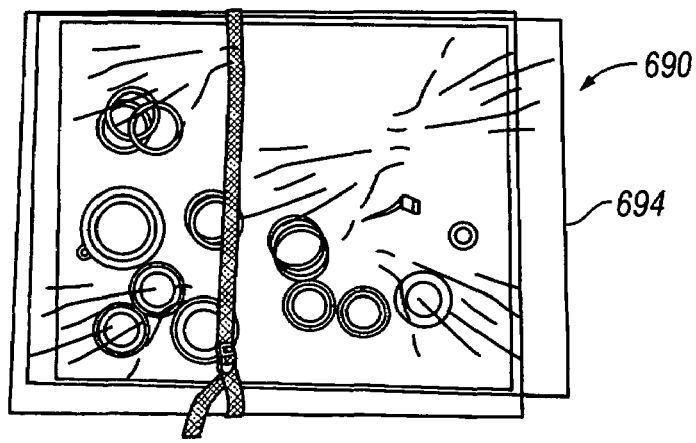

FIG. 6d depicts parts from the top insert 670. The top insert 670 comprises a main control 672 and a cooling line filter 678. FIG. 6e comprises a "pick and pack" package 690 comprising various individually packaged items 694 including individually wrapped gaskets, seals, thrust washers, and bolts.

Figure 7:
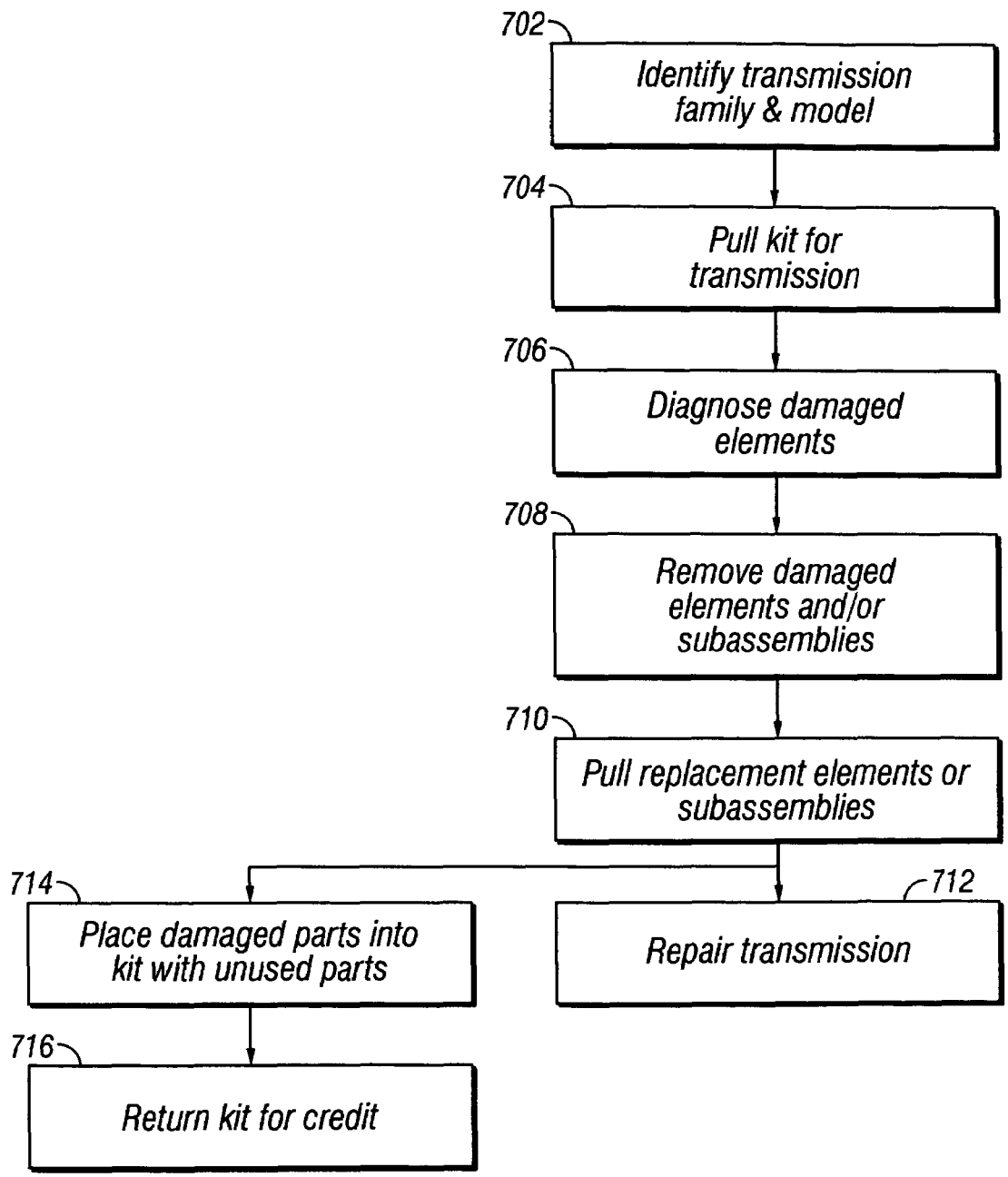
FIG. 7 is flowchart showing the method of refurbishing a transmission in accordance with one embodiment of the present invention.

FIG. 7 illustrates the method of replacing a transmission component or subassembly with a rebuilt assembly from a kit in accordance with one embodiment of the present invention. The first step 702 requires that the transmission model be identified. Next, the appropriate kit must be obtained 704. For a dealership or repair facility that services many transmissions, numerous kits might be kept in inventory. Alternatively, the kits may need to be ordered from a central warehouse. The damaged transmission must also be diagnosed 706 to determine the cause of the failure. Once diagnosed, the damaged part should be removed 708 and the replacement part from the kit installed 710. In an alternative embodiment, the transmission is diagnosed prior to ordering a kit so that the kit having the proper set of parts or assemblies can be ordered. The replacement part might be new or it might be refurbished as well. Also, it is standard to replace all wear parts such as gaskets 712. Finally, in one embodiment, the damaged parts are placed back into the kit 714 and the kit returned so that the kit can be replenished 716.

The kit of the present invention comprises remanufactured preloaded and tested sub-assemblies that meet factory specifications. By utilizing these master rebuild kits, a typical transmission repair location can cut average repair time by about 40% while controlling cost and improving quality, reliability, and durability. In an actual repair example, a 1996 Ford Mustang transmission with a defective 2-3 shift was rebuilt in less than forty minutes, and the total time from removal to finished installation was less than three hours. Upon initial inspection, the technician determined that the transmission fluid is badly burnt, and there was evidence of metal in the pan. Such symptoms suggest burnt frictions, plates, clutches and possible bushing and bearing damage or wear. Thus, such transmission was a candidate for a complete rebuild. Yet, by using a kit in accordance with one embodiment of the present invention, a job that used to require special tools and gauges is simplified. No special tools or gauges are needed to perform this expert, high quality repair because all of the sub-assemblies are remanufactured to factory specifications and tested to assure reliability and dependability. First, the technician removes all of the internal sub-assemblies including the torque converter, front pump, intermediate steels and frictions, overdrive, forward and reverse clutch, forward sun gear assembly, and the transmission pan. Next, the bolts to the valve body are loosened and removed. The old style 1-2 and 2-3 pistons are removed and will be upgraded to a newer style, along with the overdrive servo-piston, the planetary assembly, and the reverse assembly. After disassembly, the reclaimable parts can be cleaned and inspected. In one embodiment, sub-assemblies and parts that are worn and not reusable can be segregated and returned for core credit. Once the old parts are out of the way the kit parts can be laid out on a table for installation. In one embodiment, the kit contains the parts that are typically required to accomplish a factory quality rebuild. Sub-assemblies can be factory tested to insure reliability, dependability, and performance. Further, old style or obsolete parts can be upgraded to the latest design at no extra charge. The transmission can then be reassembled with the new, needed parts.

In one embodiment, the total time to rebuild the transmission is less than forty minutes, and the total time from removal to finished installation is less than three hours. In accordance with one embodiment of the present invention, one service bay and one technician can repair up to three transmissions in one day with a high level of quality.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. An automotive transmission repair kit, the repair kit comprising:
   at least one package, the package comprising a plurality of defined compartments, wherein each compartment serves as a dedicated storage location; and
   a plurality of automotive transmission components, wherein the components are disposed within the package compartments and are removeably retained by the respective compartment, and wherein a portion of the components are pre-assembled.

2. The transmission repair kit of claim 1 further comprising:
   (c) a label associated with each component.

3. The transmission repair kit of claim 1 wherein a portion of said components are pre-tested.

4. The transmission repair kit of claim 1 wherein a portion of said components are remanufactured.

5. The transmission repair kit of claim 1 wherein a portion of said components are new.

6. The transmission repair kit of claim 1 wherein said transmission components comprise a planetary gearset assembly, said gearset assembly further comprising a multi-disk clutch pack, a sun gear, and a plurality of planetary gears.

7. The transmission repair kit of claim 1 further comprising a plurality of gaskets.

8. The transmission repair kit of claim 1 further comprising an oil pump assembly.

9. The transmission repair kit of claim 1 further comprising a main control.

10. The transmission repair kit of claim 1 further comprising a piston, wherein said piston is a servo piston or an accumulator piston.

* * * * *